United States Patent [19]

Kojimoto et al.

[11] 4,113,814

[45] Sep. 12, 1978

[54] METHOD FOR PRODUCING SPECIAL PIPES HAVING LONGITUDINALLY EXTENDING DIAPHRAGM PARTITIONS

[75] Inventors: Susumu Kojimoto, Takatsuki; Takami Sato, Toyonaka; Toshio Mori, Takatsuki, all of Japan

[73] Assignee: Sumitomo Chemical Company, Limited, Osaka, Japan

[21] Appl. No.: 723,977

[22] Filed: Sep. 16, 1976

[30] Foreign Application Priority Data

Sep. 22, 1975 [JP] Japan .................................. 50-114969
Sep. 22, 1975 [JP] Japan .................................. 50-114970

[51] Int. Cl.$^2$ ............................................. B29C 17/02
[52] U.S. Cl. ........................................ 264/89; 264/99; 264/167; 264/177 R; 264/209; 264/296; 425/325; 425/326.1; 425/380

[58] Field of Search ................... 264/89, 99, 167, 173, 264/177 R, 209, 296; 425/325, 326 R, 380; 426/326.1

[56] References Cited

U.S. PATENT DOCUMENTS 3,708,253   1/1973   Lemelson ......................... 425/325 X
3,929,951   12/1975  Shibata et al. ................ 264/177 R X

*Primary Examiner*—Jan H. Silbaugh
*Attorney, Agent, or Firm*—Stevens, Davis, Miller & Mosher

[57] ABSTRACT

A method for producing a pipe, preferably of thermoplastic comprising a tubular body longitudinally partitioned by diaphragm into two conduits and having barriers projecting from the diaphragm into one of the conduits at the positions spaced along the length of the conduits and extending to contact intimately with the inside wall of the conduit. This pipe is useful as a hose for transporting liquid or for irrigation.

5 Claims, 5 Drawing Figures

METHOD FOR PRODUCING SPECIAL PIPES HAVING LONGITUDINALLY EXTENDING DIAPHRAGM PARTITIONS

RELATED PRIOR ART

U.S. Pat. No. 3,866,833 issued Feb. 18, 1975 and the prior art cited therein.

The present invention relates to special pipes which have two conduits partitioned by diaphragm, one conduit being intercepted, at proper spaces, by portions of the diaphragm, and a method and the equipment for the production thereof.

Hitherto, irrigation hoses have been used which comprise two conduits partitioned by diaphragm, the diaphragm and the wall of one conduit having small bores made therein. Further, in order to improve the uniformity of water-sprinkling on sloping ground, it is well known to intercept the perforated conduit at spaced intervals along the length.

Various irrigation hose having such intercepted conduit are well known. One is an irrigation hose made of thin thermoplastic resin film having two conduits, one of which is intercepted by applying pressure or heat to said conduit from the outside of the hose. Another is an irrigation hose made of cloth or rubber sheet having two conduits, one of the conduits being intercepted by seaming.

Those types of irrigation hoses have poor pressure resistance and tear resistance and thus a short use life. When thick thermoplastic resin pipes suitable for irrigation hoses are used, it is very difficult to intercept a conduit at the proper interval. Even if the conduit can be intercepted, like the hoses made of thin thermoplastic resin film, by applying heat or pressure from the outside or by seaming, hollows are formed on the wall which detract from its appearance. Further, the hose can be easily broken, troublesome to handle and low in strength. There is no known method for the production of thick thermoplastic resin pipes having two conduits, one of which is intercepted at spaced intervals but with no accompanying disadvantage in appearance, handling and strength.

In general, when two kinds of liquid are transported in a pipe, valves are attached to two pipes and operated to supply the liquids, to stop the supply or to control the rates of flow. In this case, however, various troubles occur; for example sometimes the supply of liquid is interrupted due to valve troubles or leakage occurring at the valves or at components to which the valves are attached. Consequently, it is desirable to send two liquids using a pipe which is divided into two conduits and has a valve mechanism to control the flow. However, pipes satisfying such requirements are not known in the art.

The inventors have found that these problems can be solved by using a thermoplastic resin pipe which comprises two conduits partitioned by a diaphragm, one conduit being intercepted by projections on the diaphragm which extend into said conduit.

An object of the present invention is to provide special pipes comprising two conduits one of which is intercepted at spaced intervals. Another object of the present invention is to provide a method for the production of said special pipes and production equipment therefor. Other objects and advantages of the present invention will be apparent from the following description.

According to the present invention, a special pipe comprising thermoplastic synthetic resin pipe having two conduits longitudinally partitioned by a diaphragm and having barriers to one conduit which are produced by projecting said diaphragm, at the spots spaced properly and longitudinally, into one conduit to contact intimately with the inside wall of the conduit. Further, the present invention includes a method of producing special pipes which comprises applying a force, from the inside of one conduit, to said diaphragm at a right angle thereto and at proper intervals whereby the diaphragm is deformed and projected into the other conduit to contact intimately with or alternatively to melt-stick to the pipe wall of said conduit while producing pipes by integrally extruding the pipe and the diaphragm, or by separately extruding them both and melt-sticking them together into a pipe having two conduits partitioned by the diaphragm.

The special pipes of the present invention are produced by deforming the diaphragm to contact intimately with or alternatively to melt-stick to the inside wall of the pipe. Consequently, there are no hollows on the outside wall and the pipes have a good appearance. Further, they are not easily broken, are easy to handle, are not easily damaged and bending causes no reduction in strength. Therefore, the special pipes of the present invention are a distinct improvement in the art.

The special pipes of the present invention can be equipped with a valve mechanism. For example, such a valve mechanism is obtained when a diaphragm made of flexible synthetic resin is deformed and projected into one conduit so as to be not fixed, but in separable intimate contact with the inside wall of said conduit, and a liquid is supplied to both conduits under different pressures.

The special pipes of the present invention can be produced so as to exhibit the following function: When the diaphragm projects, at spots spaced properly along the length, into a low-pressure conduit (referred to as "conduit A" hereinafter) to come close to or to contact intimately with the inside wall of conduit A, the projected portions of the diaphragm form barriers and intercept conduit A. While, when the pressure is higher in conduit A than in the other conduit (referred to as "conduit B" hereinafter), the portions projecting into conduit A turn over and project into conduit B whereby the barriers to conduit A are eliminated. Further, when the portions projecting into conduit B come close to or contact intimately with the inside wall of said conduit, the portions intercept conduit B.

In this way, the special pipe of the present invention can be equipped with a valve mechanism therein. As this pipe comprises two conduits, two kinds of liquid can be sent with one pipe. Further as the valve mechanism is of simple structure, it is not necessary to use two pipes equipped with valves of complicated structure as in the prior art. Therefore, the supply of liquid is not interrupted due to valve troubles or leakage of liquid occurring at the valves or at components to which the valves are attached. Further, the present special pipes have the advantage that piping cost is low.

The present invention will be illustrated specifically with reference to the drawings, which are only given for the purpose of illustration and not to be interpreted to limit the invention.

Figure 1:
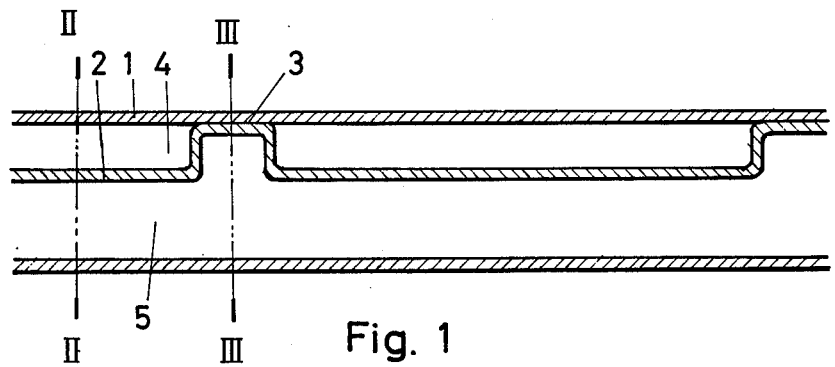
FIG. 1 is a longitudinally-sectional view of an embodiment of the present invention.
Figure 2:
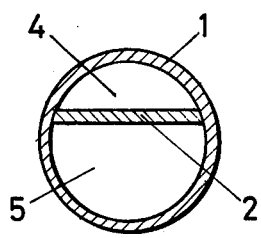
FIG. 2 is a cross-sectional view taken on a line II—II in FIG. 1.
Figure 3:
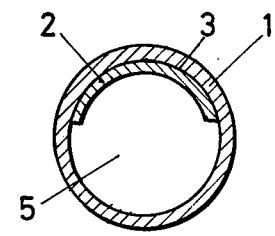
FIG. 3 is a cross-sectional view taken on a line III—III in FIG. 1.

In FIGS. 1, 2 and 3 reference numeral 1 is a pipe wall, numeral 2 is a diaphragm partitioning the pipe into two conduits, 3 is a barrier formed by deforming the diaphragm so as to intercept one conduit, and 4 and 5 are each a conduit formed by partitioning the pipe by the diaphragm 2. In FIG. 1, the barrier 3 may meltstick to or, alternatively, come into a separable intimate contact with the pipe wall 1 of the conduit 4. In the latter case, if the pressure is higher in the conduit 5 than in the conduit 4, the barrier 3 remains in the position shown in FIG. 1. When pressure levels are reversed, the barrier 3 leaves the pipe wall 1 of the conduit 4 and, as it does not stick to said pipe wall, turns over and projects into the conduit 5. Thus, the barrier in the conduit 4 is eliminated.

Production of the special pipes of the present invention will be illustrated with reference to FIGS. 4 and 5.

Figure 4:
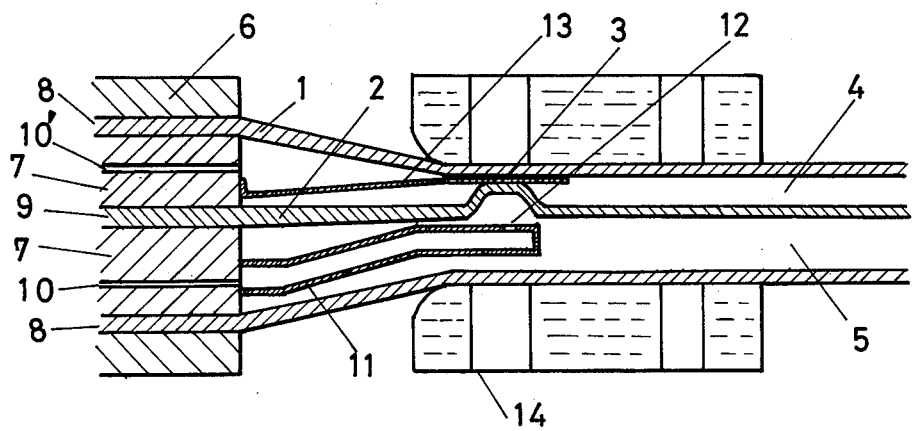
FIGS. 4 and 5 are schematic sectional side views of the equipment used for manufacture to illustrate the method for producing the present special pipes.
Figure 5:
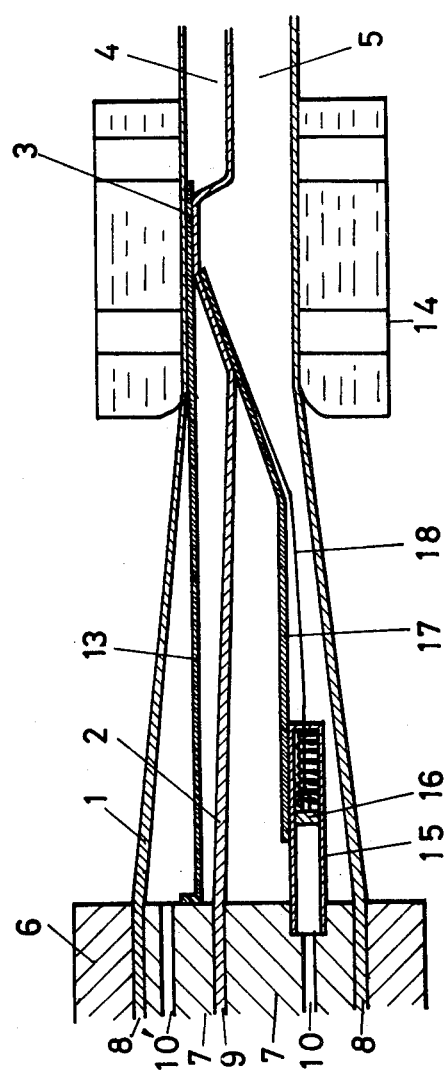

In FIG. 4, molten resin extruded from an extruder (not shown) forms a pipe in the following manner: Resin is extruded through a circular slit 8 between a die body 6 of the pipe-extruder and a mandrel 7, and through a slit 9 (for forming the diaphragm) in the mandrel 7. Thus, a pipe having diaphragm therein is produced. In this method, the pipe and diaphragm may be integrally extruded or may be separately extruded followed by melt-sticking. The pipe is sized and cooled in a vacuum sizing apparatus 14, and completely cooled in a water vessel (not shown) to solidify it. The pipe further passes through a take-off machine to take-up machine (not shown) wherein the pipe is wound in a definite length.

The barrier 3 is produced by projecting the plasticized diaphragm freshly extruded through the slit 9 into one conduit to contact intimately with or alternatively to melt-stick (to be fixed) to the inside wall of said conduit. For example, as is shown in FIG. 4, compressed air rushes out, through a slit 12 made in an air nozzle 11, against the freshly extruded diaphragm whereby the diaphragm is deformed and projected in the direction of the air stream to form a barrier. The compressed air is supplied through a hole 10 made in the mandrel 7 and the air nozzle 11, and the nozzle is attached to the nose of the mandrel 7 and inserted in the extruded pipe.

The length of the barrier in the axial direction is controlled by the time during which compressed air is permitted to escape and the rate at which the pipe is taken-off. The distance between the barriers is controlled by the time at which compressed air begins and the rate at which the pipe is taken-off. Further, the thickness of the barrier wall depends upon the pressure of compressed air. However, it is easily controlled by changing the thickness of diaphragm, in other words the width of slit 9. Deformation of the diaphragm may be carried out by expelling warm liquid such as warm water in place of compressed air.

For the material of the nozzle, pipes made of a heat-resisting material (e.g. metal, ceramic, resin) may well be used and the position the slit or hole may properly be determined depending upon the position at which deformation of the diaphragm is desired. The length of the nozzle may properly be determined depending upon the said position relative to the mandrel.

Alternatively, the barrier 3 is produced likewise by the following method: The plasticized diaphragm freshly extruded from the slit 9 is projected into one conduit by pushing the movable nose of an apparatus against the diaphragm. The apparatus is attached to the nose of the die in the other conduit and is used to deform the diaphragm by mechanical operation. A specific embodiment is shown in FIG. 5. Compressed air is supplied, through the hole 10 made in the mandrel 7, to an air cylinder 15 attached to the nose of the mandrel 7. A piston 16 is driven by the action of compressed air whereby a movable plate 17 is moved toward the diaphragm via a wire 18. The movable plate 17 projects the diaphragm into the conduit opposite to the one in which the movable plate is inserted. In this way, the barrier 3 is formed. When the supply of compressed air to the air cylinder 15 is stopped, the movable plate returns to the original position. The length of the barrier 3 in the axial direction is controlled by the time during which compressed air is supplied and the rate at which the pipe is taken-off. The distance between the barriers is controlled by the time at which supply of compressed air begins and the rate at which the pipe is taken-off. As to the movable plate, an elastic and heat-resisting thin plate made of, for example, metal or resin, is desirable and the surface of the plate is preferably slippery. For example, the movable plate may be a thin metal plate having a coating film of lubricating resin such as Teflon (Registered Trademark) on the surface. The nose of the movable plate has the shape of a circular or elliptical arc so as to fit the inside surface of the conduit via the diaphragm when pushed up to deform the diaphragm. The movable plate is driven by an air cylinder, however it may be driven by other common mechanisms for example an oil cylinder, electromagnet, pinion, rack and cam. The length of the movable plate may properly be determined depending upon the position, at which diaphragm is deformed, relative to the mandrel. Further, as the mechanically operable device for deformation of the diaphragm, one may be used having a flexible hollow body, in place of the movable plate at the nose thereof, the body being expandable vertically to the axial direction of the pipe.

The effect of the present invention may sufficiently be exhibited, when the deformed diaphragm melt-sticks to or alternatively comes into a separable but intimate contact with the inside wall of the pipe. However, in order to prevent the deformed diaphragm from melt-sticking (being fixed) to the inside wall, the following methods may be preferable. A non-tacky thin plate 13 is attached to the nose of the mandrel in the conduit diametrically opposed to the one wherein an air nozzle or diaphragm-deforming device is set up. The nose of the thin plate is located a little upstream (closer to the take-off machine) of the position at which the diaphragm is deformed, and the deformed diaphragm is taken-off while slipping over the thin plate. The non-tacky thin plate may optionally be selected from Teflon tape, Teflon-coated metallic foil and the like. Further, melt-sticking may be prevented likewise by spraying a liquid (e.g. water-soluble high-boiling liquids such as ethylene glycol and glycerin, silicon oil) in said conduit.

The diaphragm of the present special pipe may be located at the position of the diameter of the pipe or may be slightly spaced therefrom. Further, the length of the barrier may also optionally be varied. For the material for the present special pipes, any thermoplastic synthetic resin used for the preparation of usual pipes may be used. However, polyolefin resins such as low density polyethylene, high density polyethylene, polypropylene and polybutene-1 are particularly preferred. When the special pipes are equipped with a valve mechanism, flexible thermoplastic synthetic resins such as plasticized polyvinyl chloride, ethylene-vinyl acetate copolymer and thermoplastic rubber are desirable. The thickness of the barrier having valve mechanism may be easily selected in consideration of the pressure difference between two conduits in use and the flexibility of the resin of the barrier, etc., is preferably from 0.1 to 2 mm. Even if the thermoplastic synthetic resins used in the present invention contain additives, fillers or colorants which are well known to the skilled in the art, the effect of the present invention is still present.

The special pipes of the present invention are useful as irrigation hose for agriculture and forestry. When the special pipes are used as irrigation hose, holes are made, at proper spaces, in the pipe wall of the intercepted conduit and the diaphragm with water being supplied to the non-intercepted conduit. Water is then sprinkled through the holes in the pipe wall. The irrigation hose made of the special pipe (including the special pipe having melt-stick barriers and barriers having valve mechanism) has a good uniformity of water-sprinkling even when used on sloping ground. Further, when the special pipes are used for sending pond water or sea water, the pipes are easily floatable because air may be contained in the spaces between the barriers. Consequently, there is advantageously no need to float the pipes with floatation bladders as is common in the prior art. Moreover, among the present special pipes, those produced so that both conduits can be intercepted alternately are useful for sending two kinds of liquid alternately.

What is claimed is:

1. A method for the production of a thermoplastic resin pipe having a longitudinally extending diaphragm partition dividing the pipe into two conduits with a plurality of longitudinally spaced apart barriers projecting from the diaphragm toward the inside wall of the pipe, said method comprising:
    (a) extruding the pipe through an annular opening of a die head while simultaneously extruding the diaphragm material from a rectangular opening within said annular opening into the central portion of the pipe;
    (b) applying a force generally perpendicular to the longitudinal axis of the diaphragm against the diaphragm at a position located downstream of the die head but where the material of the diaphragm is still warm enough to be deformed;
    (c) forming said plurality of barriers projecting from the diaphragm by deforming the still warm material with intermittent applications of said generally perpendicular force at spaced intervals of time as the diaphragm material flows past said downstream position.

2. The method of claim 1 in which the force is always applied in the same radial direction.

3. The method of claim 1 in which said force is applied by directing a gas stream against the diaphragm.

4. The method of claim 1 in which said force is applied by pushing a radially movable plate against the diaphragm at said downstream position.

5. The method of claim 4 including preventing the melt-sticking of said barrier to the inner wall of the pipe by interposing a thin fixed plate between said barrier and said inner wall at a point adjacent said downstream position.

* * * * *